US012198224B2

United States Patent
Yuan et al.

(10) Patent No.: US 12,198,224 B2
(45) Date of Patent: Jan. 14, 2025

(54) RETRIEVAL-BASED TEXT-TO-IMAGE GENERATION WITH VISUAL-SEMANTIC CONTRASTIVE REPRESENTATION

(71) Applicant: ADOBE INC., San Jose, CA (US)

(72) Inventors: Xin Yuan, Chicago, IL (US); Zhe Lin, Clyde Hill, WA (US); Jason Wen Yong Kuen, Santa Clara, CA (US); Jianming Zhang, Fremont, CA (US); John Philip Collomosse, Pyrford (GB)

(73) Assignee: ADOBE INC., San Jose, CA (US)

( * ) Notice: Subject to any disclaimer, the term of this patent is extended or adjusted under 35 U.S.C. 154(b) by 319 days.

(21) Appl. No.: 17/651,075

(22) Filed: Feb. 15, 2022

(65) Prior Publication Data

US 2023/0260164 A1    Aug. 17, 2023

(51) Int. Cl.
*G06T 11/00*    (2006.01)
*G06F 16/53*    (2019.01)
*G06N 20/00*    (2019.01)

(52) U.S. Cl.
CPC ............. *G06T 11/00* (2013.01); *G06F 16/53* (2019.01); *G06N 20/00* (2019.01); *G06T 2207/20081* (2013.01); *G06T 2207/20084* (2013.01)

(58) Field of Classification Search
None
See application file for complete search history.

(56) References Cited

U.S. PATENT DOCUMENTS

| | | | |
|---|---|---|---|
| 10,198,671 B1* | 2/2019 | Yang | G06V 10/768 |
| 11,651,522 B2* | 5/2023 | Zhao | G06N 3/045 |
| | | | 382/239 |
| 2018/0143966 A1* | 5/2018 | Lu | G06F 18/2415 |
| 2022/0012297 A1* | 1/2022 | Basu | G06N 3/045 |
| 2022/0012919 A1* | 1/2022 | Zhao | G06N 3/045 |
| 2022/0284321 A1* | 9/2022 | Yuan | G06N 20/00 |

OTHER PUBLICATIONS

Yuan, et al., "Multimodal Contrastive Training for Visual Representation Learning," CVPR 2021, pp. 6995-7004.
Zhang, et al., "Cross-Modal Contrastive Learning for Text-to-Image Generation," CVPR 2021, pp. 833-842.
Xu, et al., "AttnGAN: Fine-Grained Text to Image Generation with Attentional Generative Adversarial Networks," CVPR 2018, pp. 1316-1324.
Ramesh, et al., "Zero-Shot Text-to-Image Generation," arXiv preprint arXiv:2102.12092v2 [cs.CV] Feb. 26, 2021, 20 pages.
Related to U.S. Appl. No. 17/190,668, filed Mar. 3, 2021.

* cited by examiner

*Primary Examiner* — Tahmina N Ansari
(74) *Attorney, Agent, or Firm* — F. CHAU & ASSOCIATES, LLC

(57) ABSTRACT

Systems and methods for image generation are described. Embodiments of the present disclosure receive a text phrase that describes a target image to be generated; generate text features based on the text phrase; retrieve a search image based on the text phrase; and generate the target image using an image generation network based on the text features and the search image.

18 Claims, 13 Drawing Sheets

RETRIEVAL-BASED TEXT-TO-IMAGE GENERATION WITH VISUAL-SEMANTIC CONTRASTIVE REPRESENTATION

BACKGROUND

The following relates generally to image processing, and more specifically to image generation using machine learning.

Digital image processing refers to the use of a computer to edit a digital image or synthesize an image using an algorithm or a processing network. Image generation is a subfield in image processing. In some examples, image generation is based on natural language input from users (i.e., text-image generation). For example, a machine learning framework may take a query as input and output a generated image comprising semantic information from the query.

However, text input may not include enough information for conventional image generation networks to construct a complex image. Therefore, there is a need in the art for improved image generation systems that can generate more complex images based on text inputs.

SUMMARY

The present disclosure describes systems and methods for image generation. Embodiments of the present disclosure include an image generation apparatus configured to generate images based on a text prompt. Embodiments of the inventive concept involve doing an image search based on the text prompt, and then using one or more retrieved images along with the text to generate a new image. A cross-modal encoder of the image generation apparatus can encode candidate search images to obtain search image representations. The same cross-modal encoder can then encode a text phrase to obtain a text phrase representation. An image search component is used to select a search image from the candidate images by comparing each of the search image representations to the text phrase representation. A search image is used as guidance along with the text phrase to generate a target image. In some examples, the image generation apparatus includes a generative adversarial network (GAN) comprising a generator and a discriminator. The generator and the discriminator are trained using contrastive learning method.

A method, apparatus, and non-transitory computer readable medium for image generation are described. One or more embodiments of the method, apparatus, and non-transitory computer readable medium include receiving a text phrase that describes a target image to be generated; generating text features based on the text phrase; retrieving a search image based on the text phrase; and generating the target image using an image generation network based on the text features and the search image.

A method, apparatus, and non-transitory computer readable medium for training a machine learning model are described. One or more embodiments of the method, apparatus, and non-transitory computer readable medium include receiving a text phrase that describes a target image to be generated; generating text features based on the text phrase; retrieving a search image based on the text phrase; generating the target image using an image generation network based on the text features and the search image; and updating parameters of the image generation network based on the target image.

An apparatus and method for image generation are described. One or more embodiments of the apparatus and method include a text encoder configured to generate text features based on a text phrase; an image search component configured to retrieve a search image based on the text phrase; and an image generation network configured to generate a target image based on the text features and the search image.

DETAILED DESCRIPTION

Figure 1:
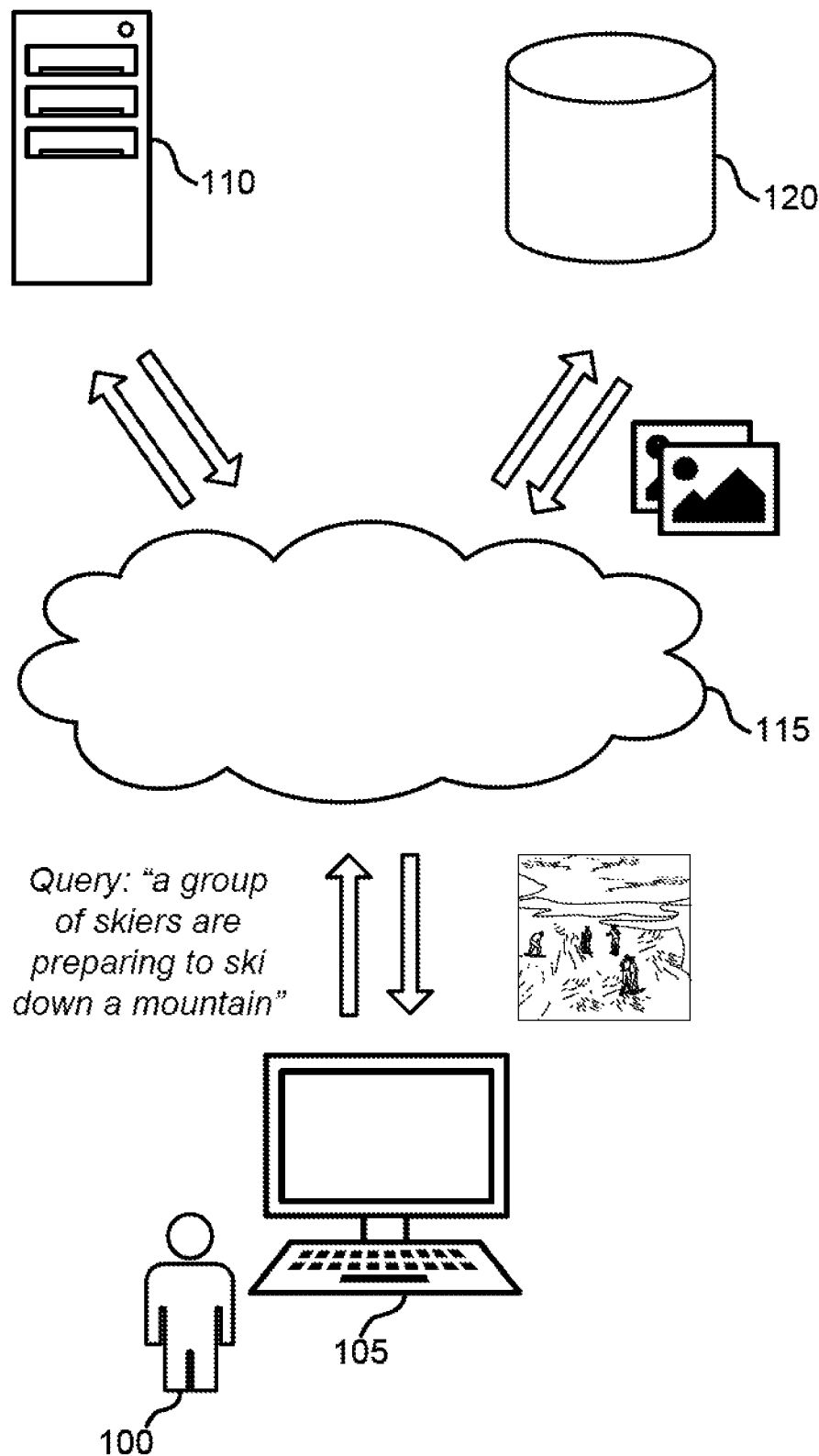
FIG. 1 shows an example of an image generation system according to aspects of the present disclosure.

The present disclosure describes systems and methods for image generation. Embodiments of the present disclosure include an image generation apparatus configured to generate images based on a text prompt. Some embodiments include searching for and retrieving search images based on the text prompt, and then using one or more retrieved search images along with the text to generate a new image. A cross-modal encoder of the image generation apparatus can encode candidate search images to obtain search image representations. The same cross-modal encoder can then encode a text phrase to obtain a text phrase representation.

In some examples, an image search component of the image generation apparatus is used to select a search image from the candidate images by comparing the search image representation to the text phrase representation. The search image is used as guidance along with the text phrase to generate a target image. In some examples, the image generation apparatus includes a generative adversarial network (GAN) comprising a generator and a discriminator. The generator and the discriminator are trained using contrastive learning method.

Computer graphics systems are used to generate realistic images that can be controlled using user-specified attributes. Recently, neural networks, such as generative adversarial networks (GANs), have been developed that can generate realistic images of faces and other objects. In some cases, a GAN includes a mapping network for generating a feature vector, and a generator network for transforming the feature vector into an image. A GAN includes a generator and a discriminator. The generator generates plausible data or instances that become negative training samples for the discriminator. The discriminator learns to distinguish the generator's fake data from real data. However, generated images from image conventional generation applications are based exclusively on user-provided text (e.g., search query). These image generation systems are unable to incorporate visual-semantic representation from search images that are retrieved based on the text.

Embodiments of the present disclosure provide a neural network trained to generate a target image based on a text phrase and a search image. The search image is retrieved based on the text phrase. That is, the inventive concept involves doing an image search based on the text phrase, and then using one or more retrieved search images along with the text phrase to generate a new image (i.e., the target image). Therefore, embodiments of the present disclosure enable text-to-image generation with visual-semantic joint representation and can generate a more complex output image. Image features in the target image has increased alignment to the text phrase and the search image because the search image is retrieved from a database based on the text phrase. Image generation quality is increased accordingly.

According to some embodiments, a cross-modal encoder of the image generation apparatus encodes candidate search images to obtain respective search image representation for each candidate search image. The same cross-modal encoder then encodes a text phrase to obtain a text phrase representation. The image generation apparatus selects one or more search images from the candidate images by comparing the respective search image representation to the text phrase representation. The selected one or more search images are used as guidance along with the text phrase to generate a target image.

By retrieving relevant search images along with the text phrase to generate a new image, embodiments of the present disclosure increase quality of image generation such that the target image comprises substantially similar image features compared to semantic information in the text phrase. Additionally, the retrieved search images are used as input and can provide guidance in the image generation process because the search images are retrieved based on the same text phrase. In some examples, the image generation apparatus includes a generator and a discriminator. During training, an output from the generator is connected directly to the discriminator input. Through backpropagation, the discriminator's classification provides a signal that the generator uses to update its weights. For example, the discriminator classifies both real images and fake images from the generator. A discriminator contrastive learning loss is used to penalize the discriminator for misclassifying a real instance as fake or a fake instance as real. Additionally, a generator contrastive learning loss is used to penalize the generator for failing to fool the discriminator.

Embodiments of the present disclosure may be used in the context of image generation applications. For example, an image generation network based on the present disclosure may take a natural language query as input, retrieve one or more search images, and generate a target image based on the textual query and the retrieved search images. An example application of the inventive concept in the image generation context is provided with reference to FIGS. 1-3.

Details regarding the architecture of an example image generation apparatus are provided with reference to FIGS. 4-8. Example processes for image processing are provided with reference to FIGS. 9-10. Example training processes are described with reference to FIGS. 11-13.

Image Generation Application

FIG. 1 shows an example of an image generation system according to aspects of the present disclosure. The example shown includes user 100, user device 105, image generation apparatus 110, cloud 115, and database 120. Image generation apparatus 110 is an example of, or includes aspects of, the corresponding element described with reference to FIG. 4.

In the example of FIG. 1, user 100 provides a query to image generation apparatus 110, e.g., via user device 105 and cloud 115. The example query includes a natural language input, that is "a group of skiers are preparing to ski down a mountain". Image generation apparatus 110 retrieves one or more search images from database 120 based on the query as guidance images for subsequent image generation. Image generation apparatus 110 generates a target image (i.e., a generated image). Image generation apparatus 110 transmits the target image to user 100, e.g., via user device 105 and cloud 115.

Image generation apparatus 110 includes a pre-trained cross-modal search component. The cross-modal search component encodes a set of candidate images stored in database 120 to obtain an image representation for each candidate image of the set of candidate images. The cross-modal search component also encodes the query to obtain a textual representation for the query. The cross-modal search component selects a subset of the candidate images (i.e., selected search images) based on a similarity or a distance between the corresponding vector representations and retrieves these search images. Image generation apparatus 110 generates a target image using an image generation network based on the query and the retrieved search images.

User device 105 may be a personal computer, laptop computer, mainframe computer, palmtop computer, personal assistant, mobile device, or any other suitable processing apparatus. In some examples, user device 105 includes software that incorporates an image generation application (e.g., an image editing application). In some examples, the image editing application on user device 105 may include functions of image generation apparatus 110.

A user interface may enable user 100 to interact with user device 105. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a user interface may be represented in code which is sent to the user device and rendered locally by a browser.

Image generation apparatus 110 receives a text phrase that describes a target image to be generated; generates text features based on the text phrase; retrieves a search image based on the text phrase; and generates the target image using an image generation network based on the text features and the search image. Image generation apparatus 110 returns the target image to user 100. The process of using image generation apparatus 110 is further described with reference to FIG. 2.

Image generation apparatus 110 includes a computer implemented network comprising a text encoder, an image search component, and an image generation network. In some examples, image generation apparatus 110 further includes a cross-modal encoder, a text attention network, an image attention network, and a discriminator network.

Image generation apparatus 110 may also include a processor unit, a memory unit, an I/O module, and a training component. The training component is used to train a machine learning model (or an image generation network). Additionally, image generation apparatus 110 can communicate with database 120 via cloud 115. In some cases, the architecture of the image generation network is also referred to as a network or a network model. Further detail regarding the architecture of image generation apparatus 110 is provided with reference to FIGS. 4-8. Further detail regarding the operation of image generation apparatus 110 at inference time is provided with reference to FIGS. 9-10.

In some cases, image generation apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

A cloud 115 is a computer network configured to provide on-demand availability of computer system resources, such as data storage and computing power. In some examples, cloud 115 provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location.

A database 120 is an organized collection of candidate search images. In some cases, the candidate search images are stored at multiple different databases. Image generation apparatus 110 can access these databases including database 120 via cloud 115. For example, database 120 stores data in a specified format known as a schema. Database 120 may be structured as a single database, a distributed database, multiple distributed databases, or an emergency backup database. In some cases, a database controller may manage data storage and processing in database 120. In some cases, a user interacts with database controller. In other cases, database controller may operate automatically without user interaction.

Figure 2:
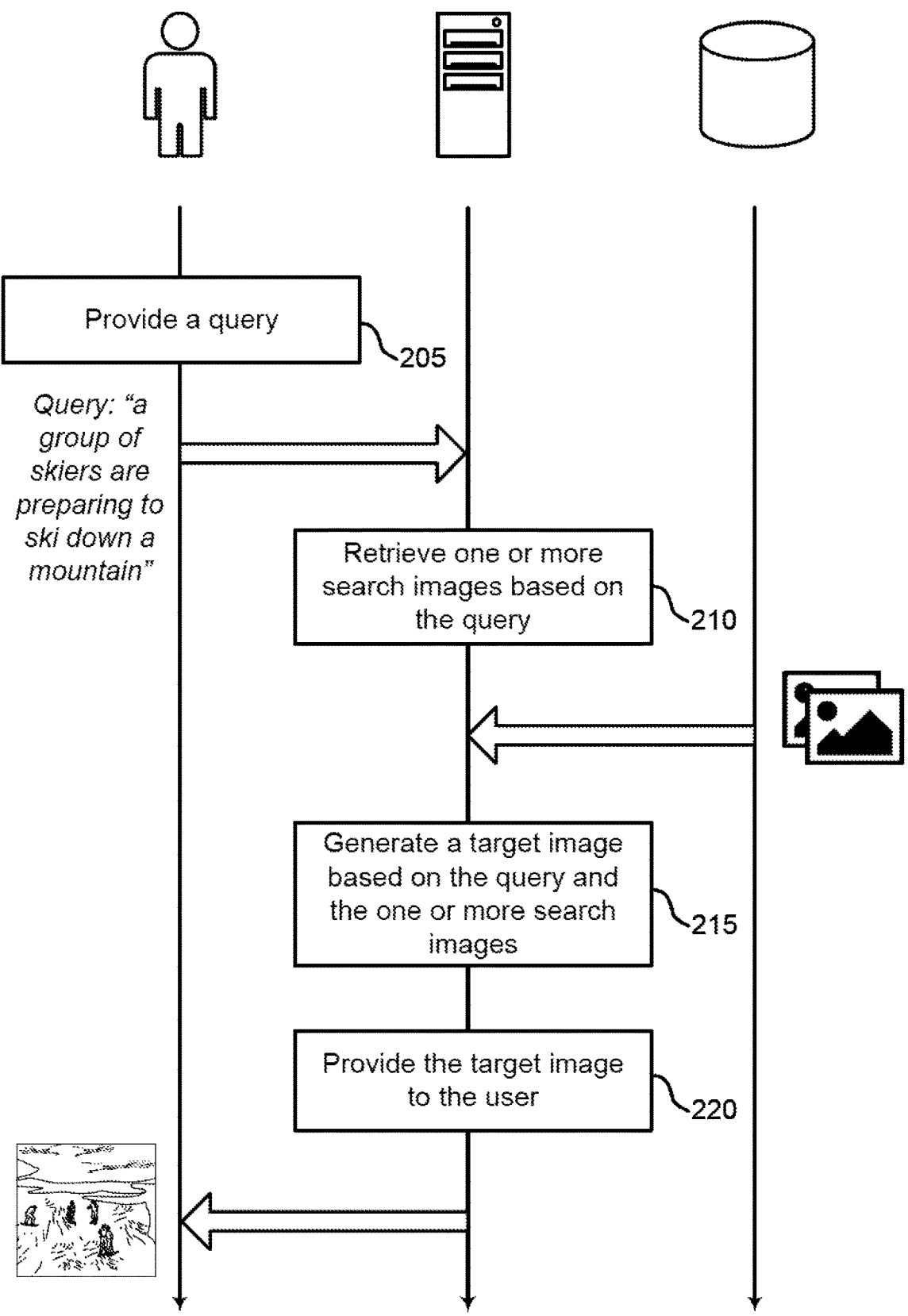
FIG. 2 shows an example of image generation according to aspects of the present disclosure.

FIG. 2 shows an example of image generation according to aspects of the present disclosure. For example, the method may be performed by user 100 interacting with image generation apparatus 110 via user device 105 as described with reference to FIG. 1. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 205, the user provides a query. In some cases, the operations of this step refer to, or may be performed by, user 100 via user device 105 as described with reference to FIG. 1. As an example, the query is a natural language input stating "a group of skiers are preparing to ski down a mountain". The user inputs a query on a user device. The image generation apparatus 110 receives the query.

At operation 210, the system retrieves one or more search images based on the query. In some cases, the operations of this step refer to, or may be performed by, image generation apparatus as described with reference to FIGS. 1 and 4. In some examples, a set of candidate images are stored in one or more databases (e.g., database 120 in FIG. 1). A cross-modal encoder is used to encode the set of candidate images and the query to obtain image encodings for the candidate images and textual encoding for the query, respectively. The system compares each of the image encodings and the textual encoding using similarity scores (e.g., cosine similarity). In some examples, the system computes a distance between the image encodings and the textual encoding. The system retrieves one or more search images from the set of candidate images based on the respective similarity score.

At operation 215, the system generates a target image based on the query and the one or more search images. In some cases, the operations of this step refer to, or may be performed by, image generation apparatus as described with reference to FIGS. 1 and 4. In some examples, the one or more search images are used as guidance to generate the target image. The target image includes image features that are substantially similar to features in the one or more search images in terms of semantic meanings.

At operation 220, the system provides the target image to the user. In some cases, the operations of this step refer to, or may be performed by, image generation apparatus as described with reference to FIGS. 1 and 4. The user can modify the query or input a different query. The system retrieves a different search image based on the modified query. The modified query and the retrieved search image are input to the image generation apparatus to generate a new target image.

Figure 3:
FIG. 3 shows an example of image retrieval for image generation according to aspects of the present disclosure.
Figure 3:
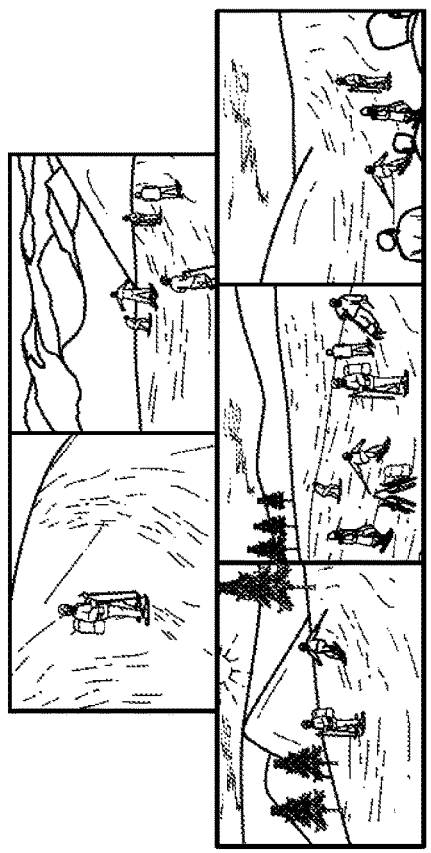

FIG. 3 shows an example of image retrieval for image generation according to aspects of the present disclosure. Image generation apparatus 110 receives a text phrase as input and performs image retrieval based on the text phrase. Image generation apparatus 110 retrieves a search image from database 120 as shown in FIG. 1. The example shown includes text phrase 300, search images 305, ground truth image 310, and target image 315. As examples illustrated in FIG. 3, text phrase 300 states "a group of skiers are preparing to ski down a mountain". Search images 305 are retrieved from a database based on text phrase 300 using a cross-modal search method. Search images 305 are also referred to as retrieved search images. Search images 305 and text phrase 300 are input to image generation apparatus 110 to obtain target image 315.

In some examples, ground truth image 310 is a validation ground truth image. Image generation apparatus 110 (see FIG. 1) generates target image 315 at inference time based on text phrase 300. In some cases, target image 315 is an output image from the generator of a GAN. Semantic features in target image 315 are substantially similar to semantic information indicated in text phrase 300 and similar to features shown in retrieved search images 305.

Text phrase 300 is an example of, or includes aspects of, the corresponding element described with reference to FIG. 6. Search images 305 is an example of, or includes aspects of, the corresponding element described with reference to FIG. 6. Target image 315 is an example of, or includes aspects of, the corresponding element described with reference to FIG. 6.

Network Architecture

In FIGS. 4-8, an apparatus and method for image generation are described. One or more embodiments of the apparatus and method include a text encoder configured to generate text features based on a text phrase; an image search component configured to retrieve a search image based on the text phrase; and an image generation network configured to generate a target image based on the text features and the search image.

Some examples of the apparatus and method further include a cross-modal encoder configured to encode the search image and the text phrase, wherein the search image is retrieved based on the encoded search image and the encoded text phrase.

Some examples of the apparatus and method further include a text attention network configured to generate text attention features, wherein the target image is generated based on the text attention features.

Some examples of the apparatus and method further include an image attention network configured to generate image attention features, wherein the target image is generated based on the image attention features.

Some examples of the apparatus and method further include a discriminator network configured to detect whether an output of the image generation network is a generated image.

In some examples, the image generation network comprises a generative adversarial network (GAN). In some examples, the text encoder comprises a recurrent neural network (RNN).

Figure 4:
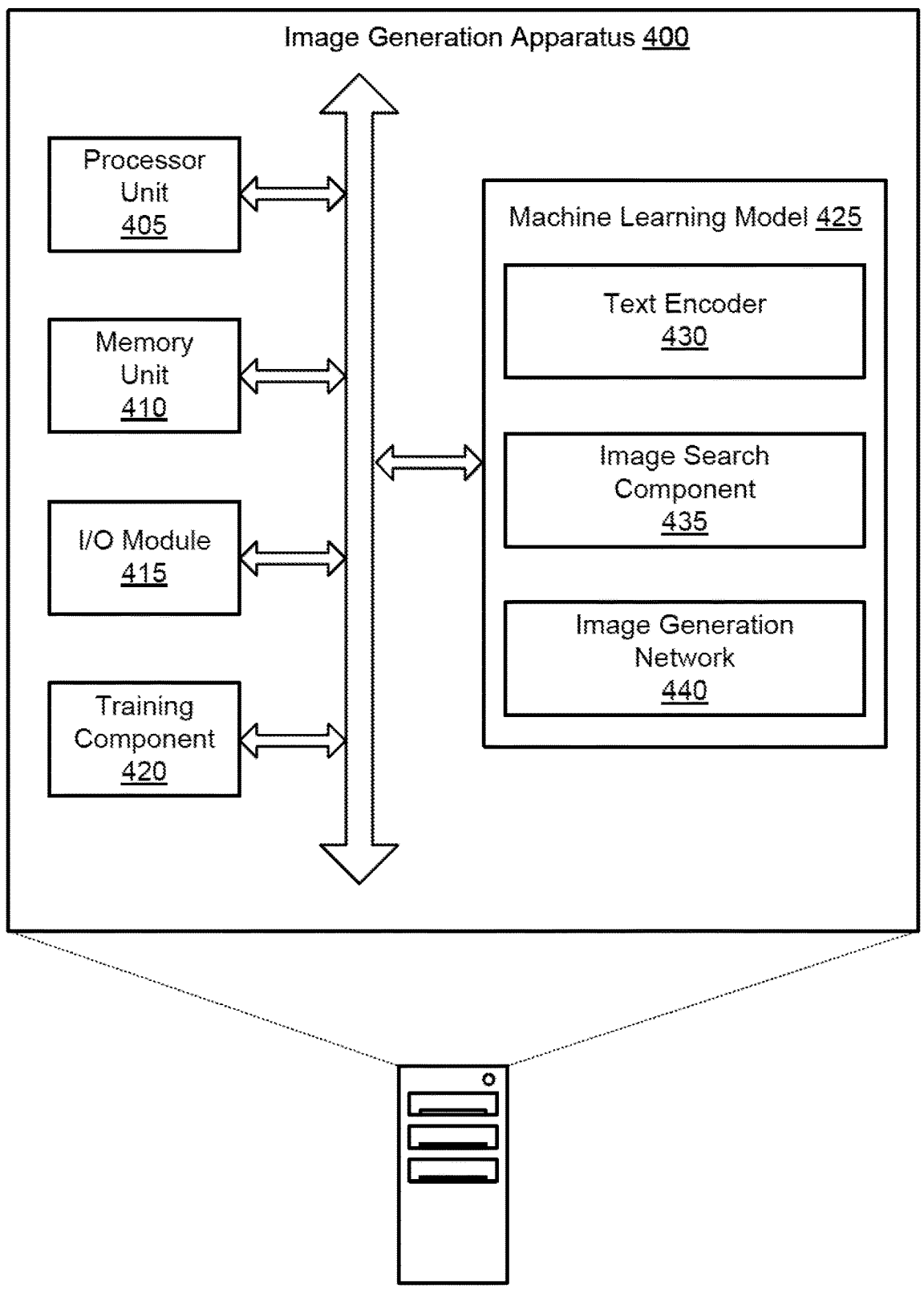
FIG. 4 shows an example of an image generation apparatus according to aspects of the present disclosure.

FIG. 4 shows an example of an image generation apparatus according to aspects of the present disclosure. The example shown includes image generation apparatus 400, processor unit 405, memory unit 410, I/O module 415, training component 420, and machine learning model 425. In one embodiment, machine learning model 425 includes text encoder 430, image search component 435, and image generation network 440. Image generation apparatus 400 is an example of, or includes aspects of, the corresponding element described with reference to FIG. 1.

Processor unit 405 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, processor unit 405 is configured to operate a memory array using a memory controller. In other cases, a memory controller is integrated into the processor. In some cases, processor unit 405 is configured to execute computer-readable instructions stored in a memory to perform various functions. In some embodiments, processor unit 405 includes special purpose components for modem processing, baseband processing, digital signal processing, or transmission processing.

Examples of memory unit 410 include random access memory (RAM), read-only memory (ROM), or a hard disk. Examples of memory unit 410 include solid state memory and a hard disk drive. In some examples, memory unit 410 is used to store computer-readable, computer-executable software including instructions that, when executed, cause a processor to perform various functions described herein. In some cases, memory unit 410 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within memory unit 410 store information in the form of a logical state.

I/O module 415 (e.g., an input/output interface) may include an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via I/O controller or via hardware components controlled by an IO controller.

In some examples, I/O module 415 includes a user interface. A user interface may enable a user to interact with a device. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a communication interface operates at the boundary between communicating entities and the channel and may also record and process communications. Communication interface is provided herein to enable a processing system coupled to a transceiver (e.g., a transmitter and/or a receiver). In some examples, the transceiver is configured to transmit (or send) and receive signals for a communications device via an antenna.

According to some embodiments of the present disclosure, image generation apparatus 400 includes a computer implemented artificial neural network (ANN) for generating a target image based on text features and a search image retrieved based on a text phrase (e.g., search query). An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

According to some embodiments, image generation apparatus 400 includes a convolutional neural network (CNN) for image generation. CNN is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

According to some embodiments, training component 420 receives a text phrase that describes a target image to be generated. In some examples, training component 420 updates parameters of image generation network 440 based on the target image. In some examples, training component 420 computes a generator contrastive learning loss based on the target image and an original image, where the parameters of image generation network 440 are updated based on the generator contrastive learning loss. In some examples, training component 420 computes a discriminator contrastive learning loss based on the target image and an original image. In some examples, training component 420 updates parameters of the discriminator network based on the discriminator contrastive learning loss. In some examples, training component 420 trains an image attention network to generate image attention features, where the target image is generated based on the image attention features. In some examples, training component 420 trains a cross-modal encoder configured to encode the search image and the text phrase, where the search image is retrieved based on the encoded search image and the encoded text phrase.

According to some embodiments, machine learning model 425 receives a text phrase that describes a target image to be generated. In some examples, machine learning model 425 generates a random noise vector. In some examples, machine learning model 425 combines the random noise vector with the text features to obtain noisy text features. In some examples, machine learning model 425 upsamples the noisy text features, where the target image is generated based on the upsampled noisy text features.

According to some embodiments, text encoder 430 generates text features based on the text phrase. In some examples, the text encoder 430 includes a recurrent neural network (RNN). A recurrent neural network (RNN) is a class of ANN in which connections between nodes form a directed graph along an ordered (i.e., a temporal) sequence. This enables an RNN to model temporally dynamic behavior such as predicting what element should come next in a sequence. Thus, an RNN is suitable for tasks that involve ordered sequences such as text recognition (where words are ordered in a sentence). The term RNN may include finite impulse recurrent networks (characterized by nodes forming a directed acyclic graph), and infinite impulse recurrent networks (characterized by nodes forming a directed cyclic graph). Text encoder 430 is an example of, or includes aspects of, the corresponding element described with reference to FIG. 7.

According to some embodiments, image search component 435 retrieves a search image based on the text phrase. In some examples, image search component 435 selects the search image by comparing the search image representation and the text phrase representation. In some examples, image search component 435 retrieves a set of search images based on the text phrase, where the target image is generated based on the set of search images. Image search component 435 is an example of, or includes aspects of, the corresponding element described with reference to FIG. 5.

According to some embodiments, image generation network 440 generates the target image based on the text features and the search image. In some examples, image generation network 440 includes a generative adversarial network (GAN). Image generation network 440 is an example of, or includes aspects of, the corresponding element described with reference to FIGS. 5 and 6.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

Figure 5:
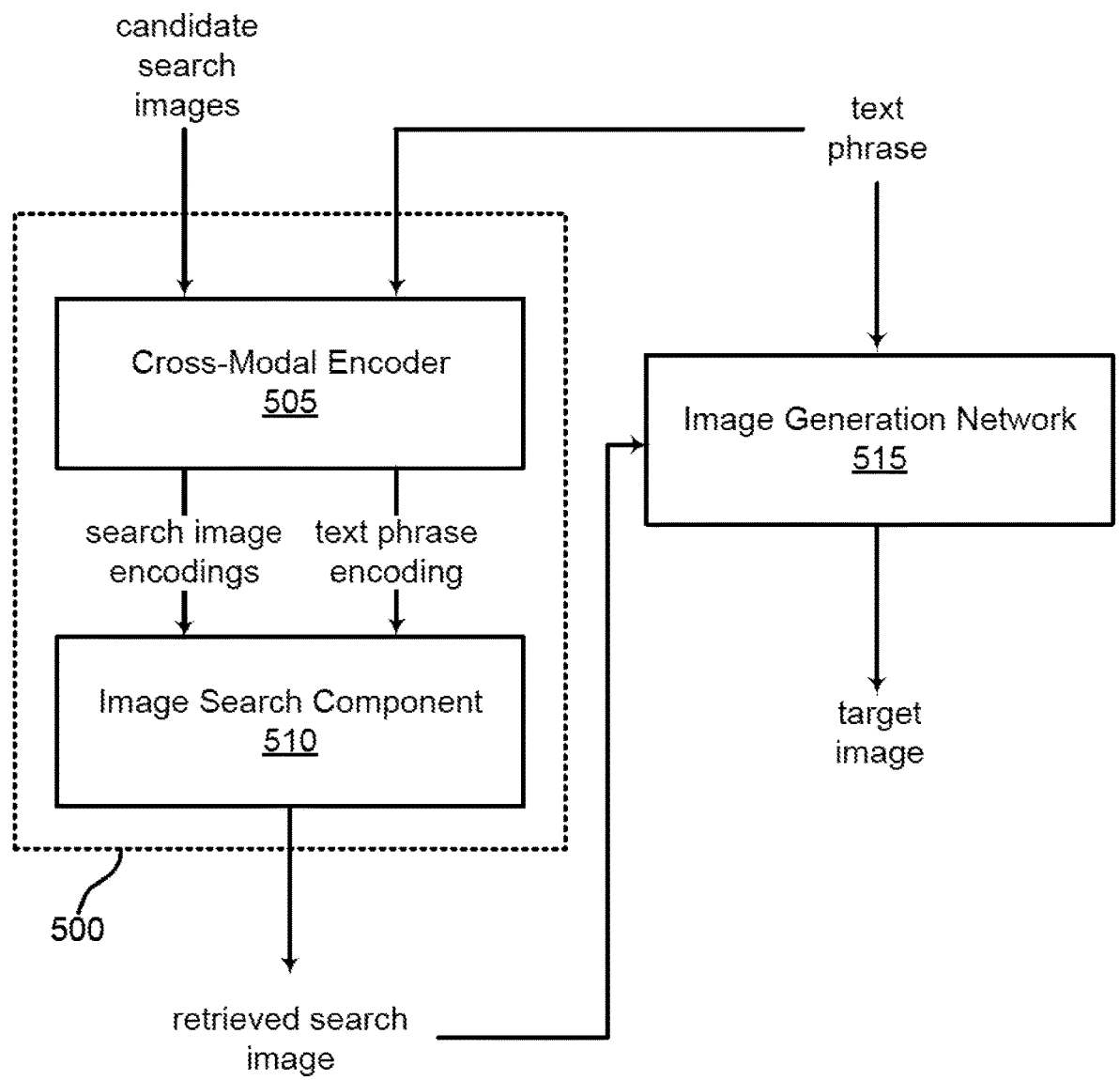
FIG. 5 shows an example of an image generation diagram according to aspects of the present disclosure.

FIG. 5 shows an example of an image generation diagram according to aspects of the present disclosure. The example shown includes cross-modal search 500, cross-modal encoder 505, image search component 510, and image generation network 515. In some examples, cross-modal search 500 includes a cross-modal search network. Cross-modal search 500 includes cross-modal encoder 505 and image search component 510. According to some embodiments, cross-modal encoder 505 encodes the search image to obtain a search image representation. Cross-modal encoder 505 encodes the text phrase to obtain a text phrase representation.

FIG. 5 illustrates an example of text-to-image generation process. In some examples, image generation network 515 (e.g., a generative model) and cross-modal search 500 are used to generate one or more target images from text phrase (i.e., a query provided by user). In some examples, cross-modal search 500 takes text phrase and candidate search images as input and outputs retrieved search images. Next, the retrieved search images and the text phrase are input to image generation network 515 to generate a target image. Image generation network 515 is trained using visual-semantic contrastive learning method.

According to an embodiment, cross-modal encoder 505 is configured to encode the search image and the text phrase, wherein the search image is retrieved based on the encoded search image and the encoded text phrase. In some examples, a set of candidate search images are stored in database 120 (see FIG. 1) and are input to cross-modal encoder 505. Cross-modal encoder 505 then generates a search image encoding for each candidate search image. Additionally, text phrase is input to cross-modal encoder 505, which outputs text phrase encoding based on the text phrase. Image search component 510 selects the search image from the set of candidate search images by comparing the search image encoding and the text phrase encoding. Image search component 510 retrieves the search image from database 120 (i.e., retrieved search image).

In some examples, cross-modal encoder 505 (or a retrieval module including cross-modal encoder 505) is pre-trained on cross-modal search tasks using contrastive learning. A method, apparatus, non-transitory computer readable medium, and system for training cross-modal encoder 505 includes identifying a training set comprising a set of images and a set of captions corresponding to the images, encoding the images using an image encoder to produce encoded images, encoding the captions using a text encoder to produce encoded text, computing a multi-modal loss function based on the encoded images and the encoded text, the multi-modal loss function comprising at least one image loss term, at least one text loss term, and at least one cross-modal term, and training the image encoder and the text encoder based on the multi-modal loss function.

In some examples, the multi-modal loss function includes an image-text contrastive loss. The image-text contrastive loss is based on a distance between a query image and a positive or negative sample of encoded text. For example, a low image-text contrastive loss indicates that a query image may be similar to a phrase of text, and a high image-text contrastive loss indicates that an image may not be similar to a phrase of text, based on the associated encoded query image and the encoded text.

In some examples, the multi-modal loss function includes a text-image contrastive loss based on a distance between a query text and a positive or negative sample of encoded image. For example, a low image-text contrastive loss indicates that a query text may be similar to an encoded image, and a high image-text contrastive loss indicates that a query text may not be similar to an encoded image, based on the associated encoded query text and the encoded image.

An example architecture for multi-modal contrastive training framework is composed of intra-modal and inter-modal contrastive learning with different types of losses. The intra-modal contrastive training scheme is based on contemporary self-supervised representation learning framework (for example, MoCo-v2) to capture intrinsic patterns of augmented image examples. However, some self-supervised methods lack the ability to learn semantic information from higher-level concepts. Therefore, cross-modal encoder 505 is configured to capture semantic information from augmented sentences. Tag information in the contrastive loss may also be used to develop image representations.

The inter-modal contrastive training scheme is designed to enhance image features by embracing the cross-modal interactions. Image and text features are embedded into a common space and image-semantic contrastive losses are designed to force the features of semantically similar input examples to be closer. Image features are adjusted according to captions via back propagation, and vice versa. After the completion of multi-modal contrastive training, cross-modal encoder 505 can be directly applied to or fine-tuned for cross-modal search 500.

Image search component 510 is an example of, or includes aspects of, the corresponding element described with reference to FIG. 4. Image generation network 515 is an example of, or includes aspects of, the corresponding element described with reference to FIGS. 4 and 6.

Figure 6:
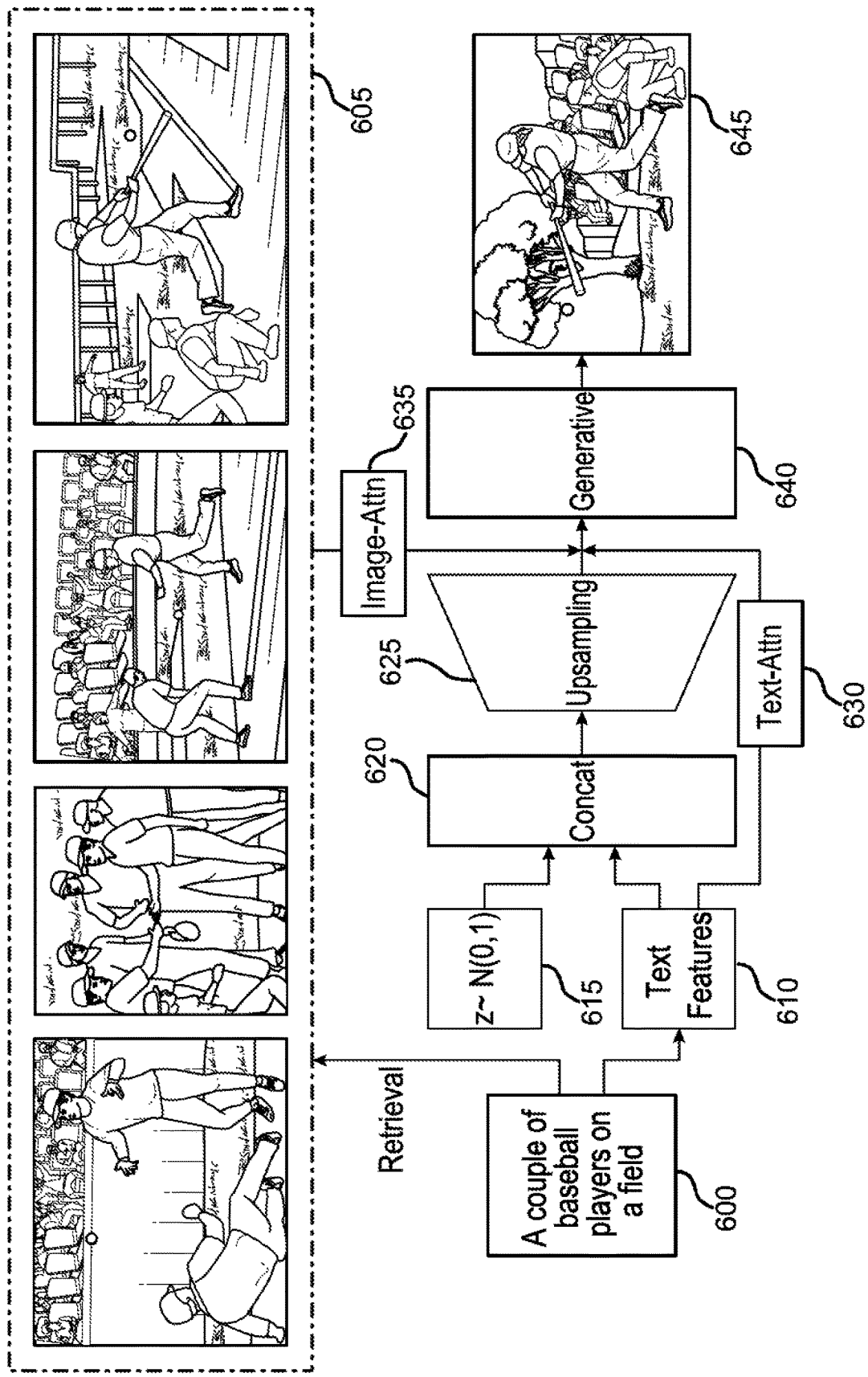
FIG. 6 shows an example of a machine learning model according to aspects of the present disclosure.

FIG. 6 shows an example of a machine learning model according to aspects of the present disclosure. The example shown includes text phrase 600, search images 605, text features 610, random noise vector 615, noisy text features 620, upsampling layer 625, text attention network 630, image attention network 635, image generation network 640, and target image 645.

According to some embodiments, text attention network 630 is applied to text features 610 to obtain text attention features, where the target image 645 is generated based on the text attention features. Text attention network 630 is configured to generate text attention features. Text attention network 630 is an example of, or includes aspects of, the corresponding element described with reference to FIG. 7.

According to some embodiments, image attention network 635 is applied to the search image to obtain image attention features, where the target image 645 is generated based on the image attention features. Image attention network 635 is configured to generate image attention features. Image attention network 635 is an example of, or includes aspects of, the corresponding element described with reference to FIG. 8.

According to an embodiment, text phrase 600 is input to a text encoder to generate text features 610. As an example, text phrase 600 states "a couple of baseball players on a field", which is a query from user 100. Image generation apparatus retrieves search images of baseball players based on text phrase 600. In some examples, a set of search images are stored in database 120 (see FIG. 1). Text features 610 of text phrase 600 (i.e., a couple of baseball players on a field) is concatenated with random noise vector 615 to obtain noisy text features 620. In some examples, random noise vector 615 is a normal distribution (i.e., $z \sim N(0,1)$).

According to an embodiment, noisy text features 620 (i.e., the concatenated output) is input to upsampling layer 625 to obtain upsampled noisy text features. The upsampled noisy text features are input to image generation network 640 (i.e., a generative model) to generate a target image 645 (e.g., image of baseball players on a field).

Additionally, output from text attention network 630 and output from image attention network 635 are input to image generation network 640 along with the upsampled noisy text features. In some examples, visual-semantic contrastive learning method is used to train image generation network 640. The visual-semantic contrastive learning involves multi-modal training with multiple types of contrastive losses.

Image generation network 640 is an example of, or includes aspects of, the corresponding element described with reference to FIGS. 4 and 5. Text phrase 600 is an example of, or includes aspects of, the corresponding element described with reference to FIG. 3. Search images 605 is an example of, or includes aspects of, the corresponding element described with reference to FIG. 3. Target image 645 is an example of, or includes aspects of, the corresponding element described with reference to FIG. 3.

Figure 7:
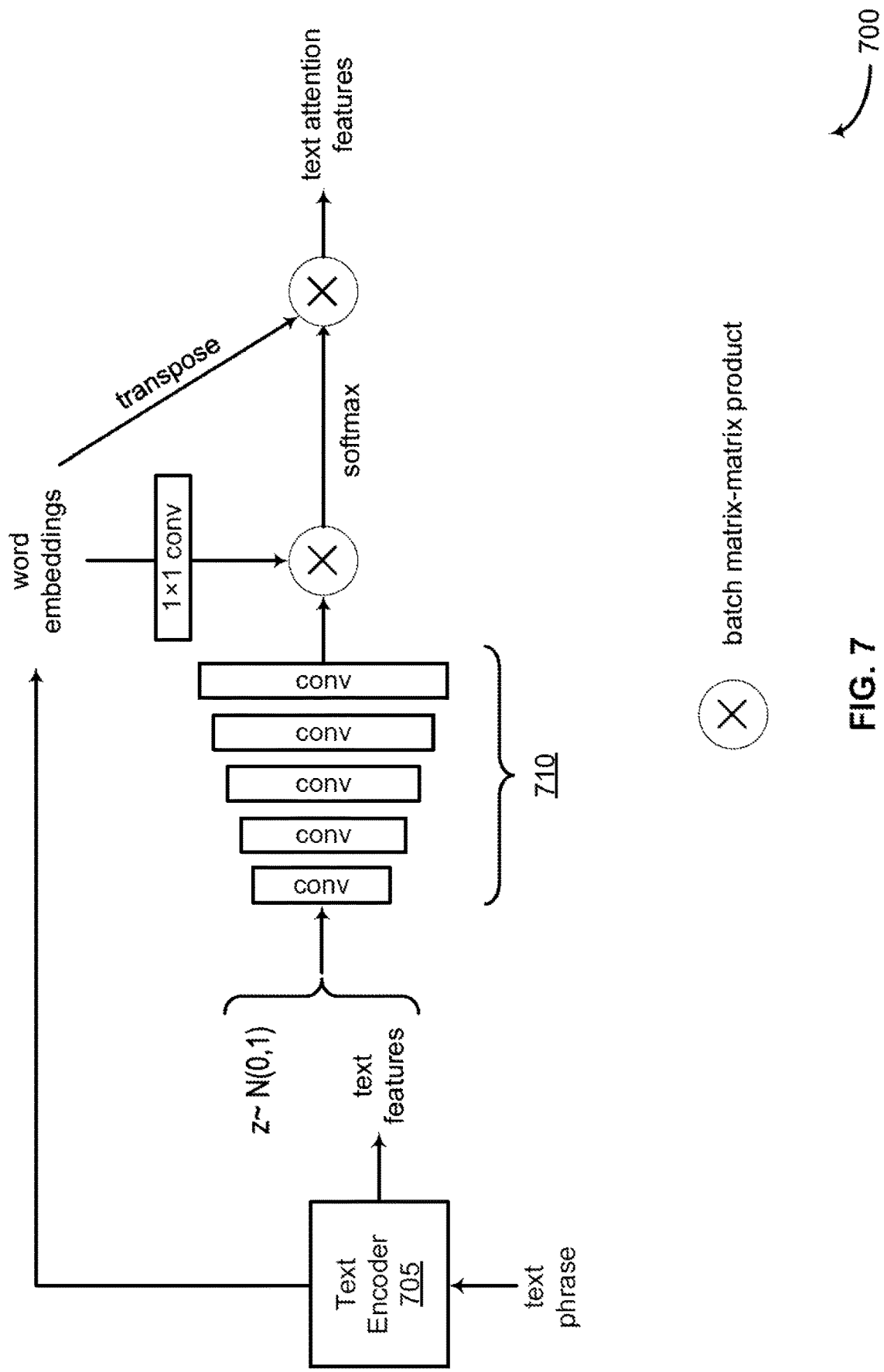
FIG. 7 shows an example of a text attention network according to aspects of the present disclosure.

FIG. 7 shows an example of text attention network 700 according to aspects of the present disclosure. The example shown includes text attention network 700, text encoder 705, and convolutional layer 710. According to an embodiment, text attention network 700 is configured to generate text-attentive feature maps (or text attention features). In some examples, text encoder 705 extracts text features from a text phrase. The text features and a random noise vector (e.g., normal distribution z~N(0,1)) are input to a set of convolutional layers 710. Batch matrix-matrix product is generated based on word embeddings and output of convolutional layers 710. The word embeddings are transposed and softmax is applied to the batch matrix-matrix product. Text-attentive feature maps (or text attention features) are generated based on transposed word embeddings and an output from softmax.

A word embedding is a learned representation for text where words that have the same meaning have a similar representation. Glove and Word2vec are examples of systems for obtaining a vector representation of words. GloVe is an unsupervised algorithm for training a network using on aggregated global word-word co-occurrence statistics from a corpus. Similarly, a Word2vec model may include a shallow neural network trained to reconstruct the linguistic context of words. GloVe and Word2vec models may take a large corpus of text and produces a vector space as output. In some cases, the vector space may have a large number of dimensions. Each word in the corpus is assigned a vector in the space. Word vectors are positioned in the vector space in a manner such that similar words are located nearby in the vector space. In some cases, an embedding space may include syntactic or context information in additional to semantic information for individual words.

In some cases, a softmax function is used as the activation function of a neural network to normalize the output of the network to a probability distribution over predicted output classes. After applying the softmax function, each component of the feature map is in the interval (0, 1) and the components add up to one. These values are interpreted as probabilities.

Text attention network 700 is an example of, or includes aspects of, the corresponding element described with reference to FIG. 6. Text encoder 705 is an example of, or includes aspects of, the corresponding element described with reference to FIG. 4. Convolutional layer 710 is an example of, or includes aspects of, the corresponding element described with reference to FIG. 8.

Figure 8:
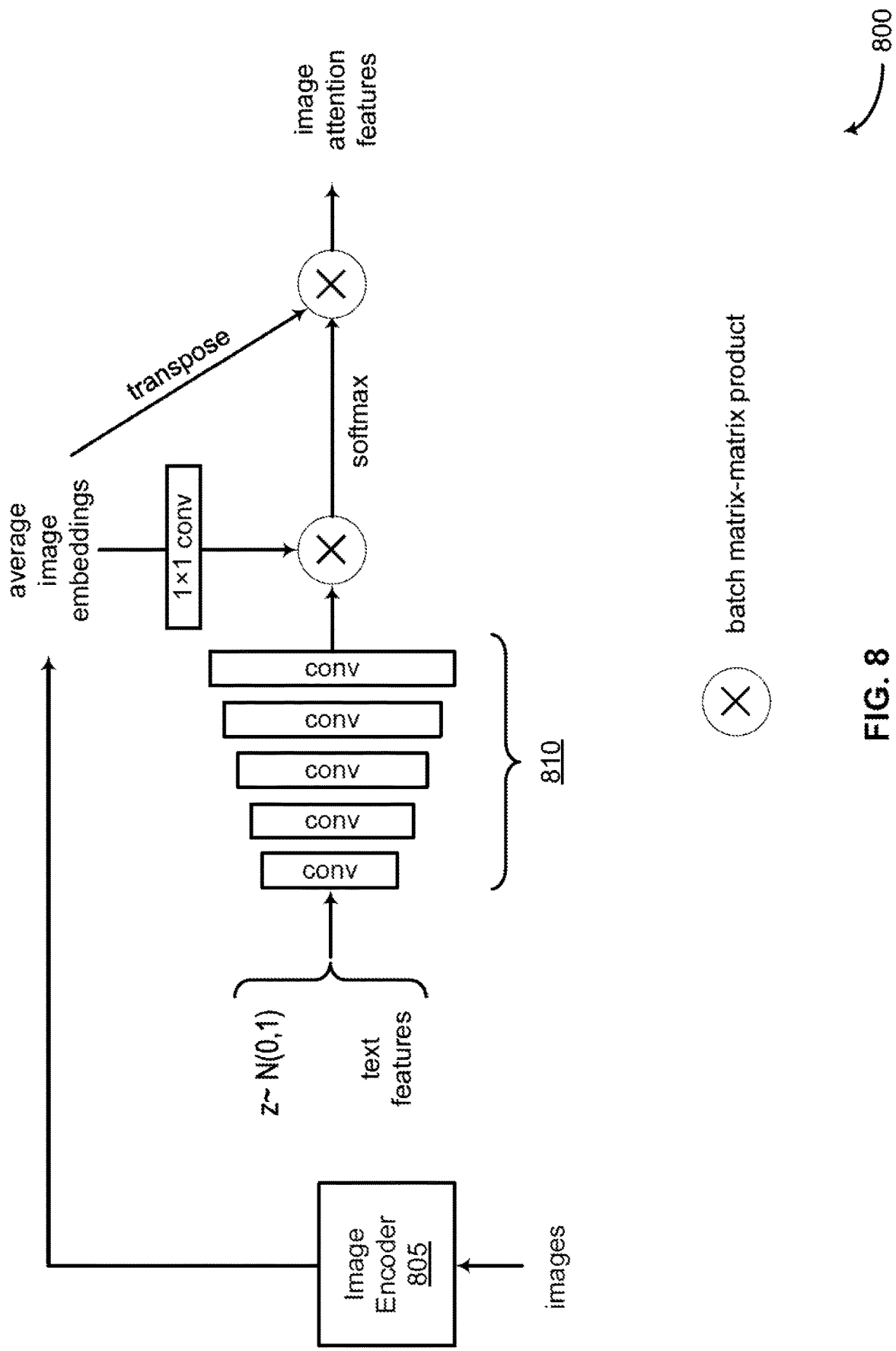
FIG. 8 shows an example of an image attention network according to aspects of the present disclosure.

FIG. 8 shows an example of image attention network 800 according to aspects of the present disclosure. The example shown includes image attention network 800, image encoder 805, and convolutional layer 810. According to an embodiment, image attention network 800 is configured to generate image-attentive feature maps (or image attention features). In some examples, a set of images are encoded using image encoder 805 to generate image encodings corresponding to each of the set of images. Image attention network 800 then generates average image embeddings based on the image encodings. Additionally, text features (i.e., features based on a text phrase, see FIG. 7) and a random noise vector (e.g., normal distribution z~N(0,1)) are input to a set of convolutional layers 810. Batch matrix-matrix product is generated based on the average image embeddings and output from convolutional layers 810. Softmax function is applied to the batch matrix-matrix product and a transpose operation is applied to the average image embeddings. Image-attentive feature maps (i.e., image attention features) are generated based on transposed average image embeddings and an output from softmax.

Image attention network 800 is an example of, or includes aspects of, the corresponding element described with reference to FIG. 6. Convolutional layer 810 is an example of, or includes aspects of, the corresponding element described with reference to FIG. 7.

Image Generation

Figure 9:
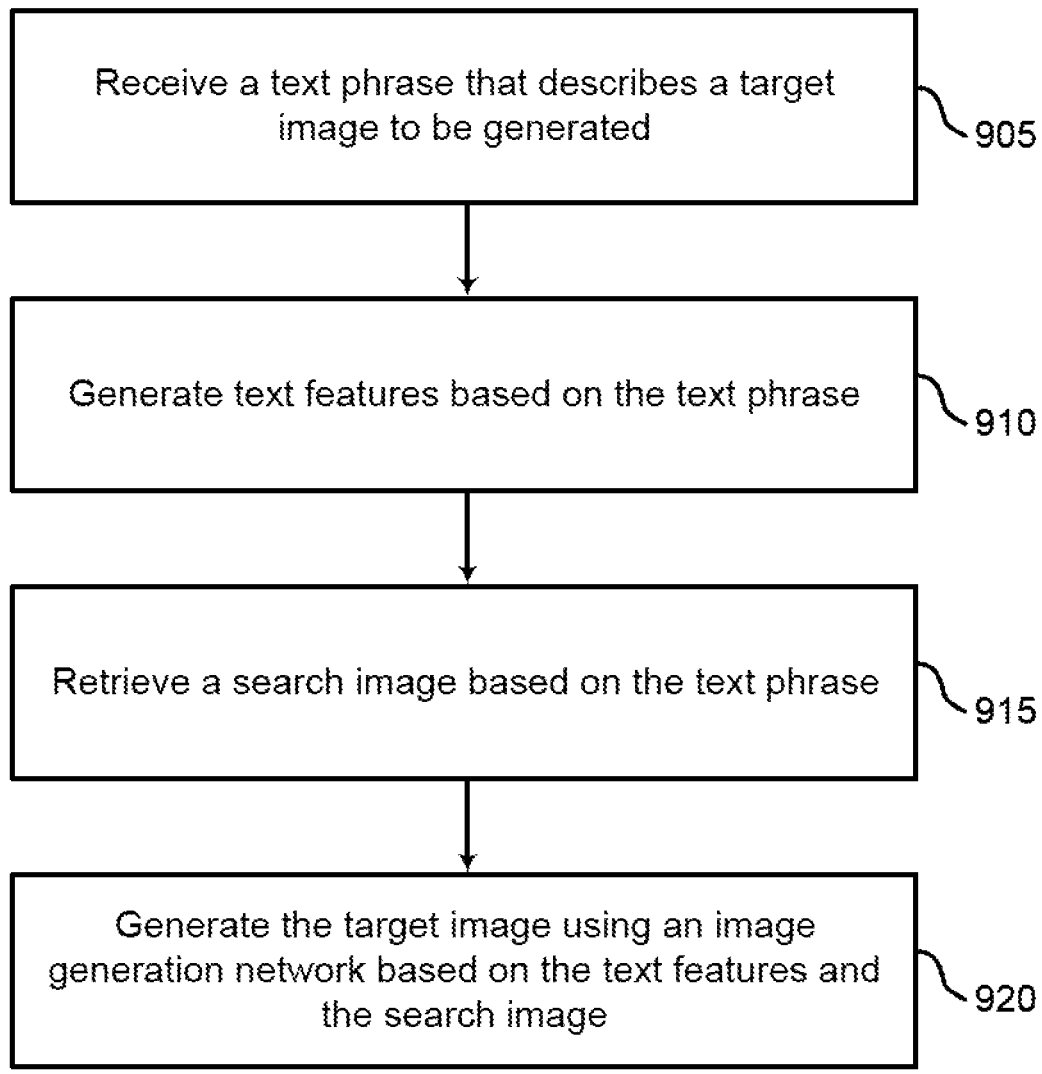
FIG. 9 shows an example of generating a target image according to aspects of the present disclosure.
Figure 10:
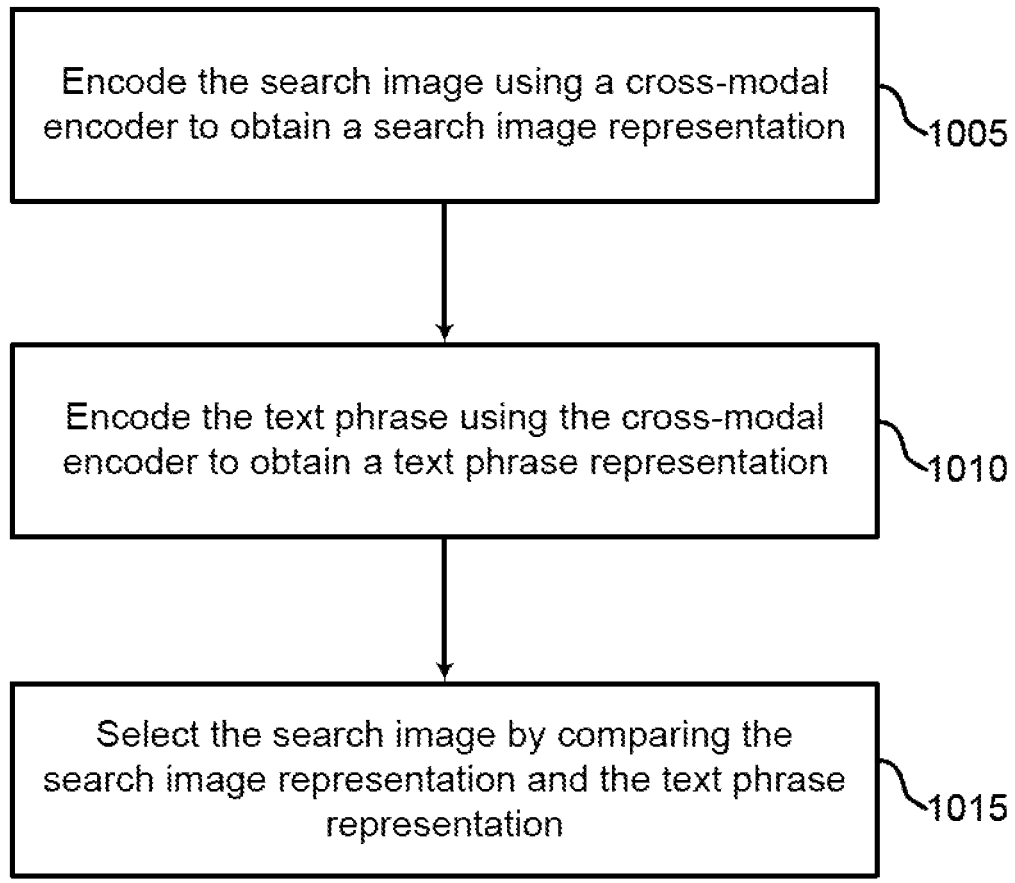
FIG. 10 shows an example of selecting a search image according to aspects of the present disclosure.

In FIGS. 9-10, a method, apparatus, and non-transitory computer readable medium for image generation are described. One or more embodiments of the method, apparatus, and non-transitory computer readable medium include receiving a text phrase that describes a target image to be generated; generating text features based on the text phrase; retrieving a search image based on the text phrase; and generating the target image using an image generation network based on the text features and the search image.

Some examples of the method, apparatus, and non-transitory computer readable medium further include encoding the search image using a cross-modal encoder to obtain a search image representation. Some examples further include encoding the text phrase using the cross-modal encoder to obtain a text phrase representation. Some examples further include selecting the search image by comparing the search image representation and the text phrase representation.

Some examples of the method, apparatus, and non-transitory computer readable medium further include generating a random noise vector. Some examples further include combining the random noise vector with the text features to obtain noisy text features. Some examples further include upsampling the noisy text features, wherein the target image is generated based on the upsampled noisy text features.

Some examples of the method, apparatus, and non-transitory computer readable medium further include applying a text attention network to the text features to obtain text attention features, wherein the target image is generated based on the text attention features.

Some examples of the method, apparatus, and non-transitory computer readable medium further include applying an image attention network to the search image to obtain image attention features, wherein the target image is generated based on the image attention features. Some examples of the method, apparatus, and non-transitory computer readable medium further include retrieving a plurality of search images based on the text phrase, wherein the target image is generated based on the plurality of search images.

FIG. 9 shows an example of generating a target image according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 905, the system receives a text phrase that describes a target image to be generated. In some cases, the operations of this step refer to, or may be performed by, machine learning model as described with reference to FIG. 4. In some examples, a user provides the text phrase or a search query. The user may be interested in obtaining one or more generated images (i.e., target images produced by the image generation apparatus). In some cases, the image generation apparatus or image editing application is implemented on the user's electronic devices (e.g., mobile phone, pad, laptop).

At operation 910, the system generates text features based on the text phrase. In some cases, the operations of this step refer to the process of generating text features using a text encoder with reference to FIG. 7. The operations of this step may be performed by the text encoder as described with reference to FIG. 4. For example, the text encoder may include a transformer architecture such as a Bidirectional Encoder Representations from Transformers (BERT) architecture with one or more multi-layer perceptron (MLP) heads. A transformer architecture is a neural network that includes multiple attention heads. For example, each attention head can identify different portions of a sentence to use in determining the meaning of a given word in the sentence.

Semantic information from the text phrase is utilized for higher image feature learning by enabling cross-modal interactions using inter-modality contrastive training schemes. Image and textual representations are embedded into a common space followed by ranking-based contrastive loss to learn image and textual model parameters.

At operation 915, the system retrieves a search image based on the text phrase. In some cases, the operations of this step refer to the process of retrieving a search image using an image search component with reference to FIGS. 5 and 10. The operations of this step may be performed by the image search component as described with reference to FIG. 4.

A set of candidate search images are stored in a database (e.g., database 120 in FIG. 1). The set of candidate search images may be stored in multiple different databases. In some embodiments, a cross-modal encoder is pre-trained to encode the search image to obtain a search image representation. The cross-modal encoder encodes the text phrase to obtain a text phrase representation. The cross-modal encoder then selects the search image by comparing the search image representation and the text phrase representation.

At operation 920, the system generates the target image using an image generation network based on the text features and the search image. In some cases, the operations of this step refer to the process of generating a target image using an image generation network with reference to FIGS. 5-6. The operations of this step may be performed by the image generation network as described with reference to FIG. 4.

According to an embodiment, an image generation network includes a generative adversarial network (GAN). A GAN is a category of ANN where two neural networks are trained based on a contest with each other. Given a training set, the network learns to generate new data with similar properties as the training set. For example, a GAN trained on photographs can generate new images that look authentic to a human observer. GANs may be used in conjunction with supervised learning, semi-supervised learning, unsupervised learning, and reinforcement learning. In some examples, a GAN includes a generator network and a discriminator network. The generator network generates candidates while the discriminator network evaluates them. The generator network learns to map from a latent space to a data distribution of interest, while the discriminator network distinguishes candidates produced by the generator network from the true data distribution. The generator network's training objective is to increase the error rate of the discriminator network (i.e., to produce novel candidates that the discriminator network classifies as real).

In some examples, features in the target image (i.e., a generated image) are highly aligned to the text phrase (query provided by a user) due to the retrieved search images as input to the image generation network. That is, the target image includes substantially similar semantic features to semantic information as indicated in the text phrase. Accordingly, the quality of the generated image from the image generation network is increased.

FIG. 10 shows an example selecting a search image according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1005, the system encodes the search image using a cross-modal encoder to obtain a search image representation. In some cases, the operations of this step refer to, or may be performed by, cross-modal encoder as described with reference to FIG. 5.

At operation 1010, the system encodes the text phrase using the cross-modal encoder to obtain a text phrase representation. In some cases, the operations of this step refer to, or may be performed by, cross-modal encoder as described with reference to FIG. 5. In some examples, a set of candidate images are stored in one or more databases (e.g., database 120 in FIG. 1). The cross-modal encoder is used to encode the set of candidate images and the text phrase (e.g., query) to obtain image encodings for the candidate images and textual encoding for the text phrase, respectively.

At operation 1015, the system selects the search image by comparing the search image representation and the text phrase representation. In some cases, the operations of this step refer to, or may be performed by, image search component as described with reference to FIG. 4. Further detail regarding the process of retrieving a search image using an image search component is provided with reference to FIG. 5. The system compares each of the image encodings and the textual encoding using similarity scores (e.g., cosine similarity). In some examples, the system computes a distance between each image encoding corresponding to a candidate image and the textual encoding corresponding to the text phrase. The image search component of the system retrieves one or more search images from the set of candidate images based on the respective similarity score and a threshold value. In some examples, a similarity score may be computed using the encoded representation of each candidate search image (e.g., the cosine similarity between the search image representation and the text phrase representation). Candidate search images corresponding to the top k scores may be selected as the search images. The one or more search images are then used as guidance for image generation.

Training

Figure 11:
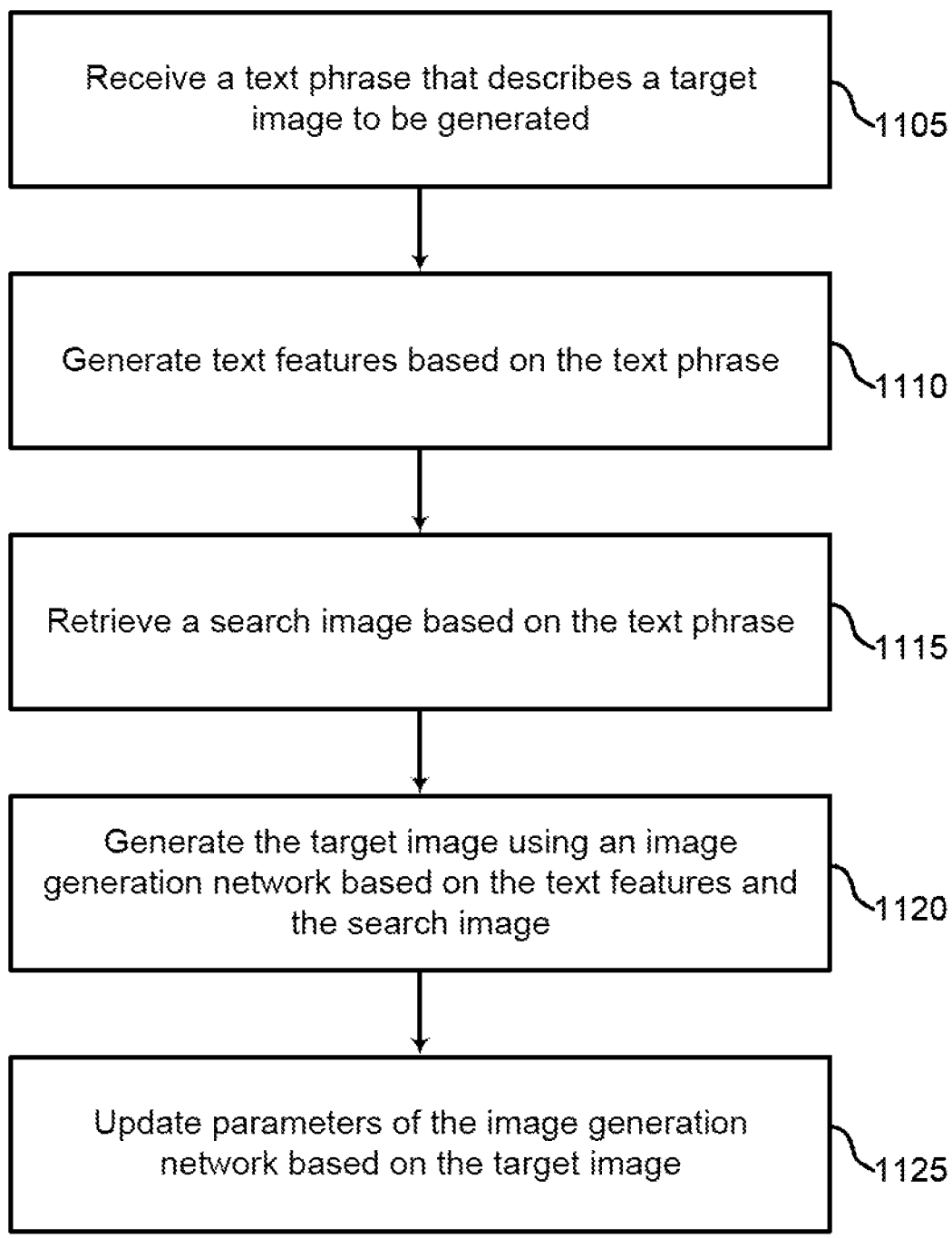
FIG. 11 shows an example of training a machine learning model according to aspects of the present disclosure.
Figure 12:
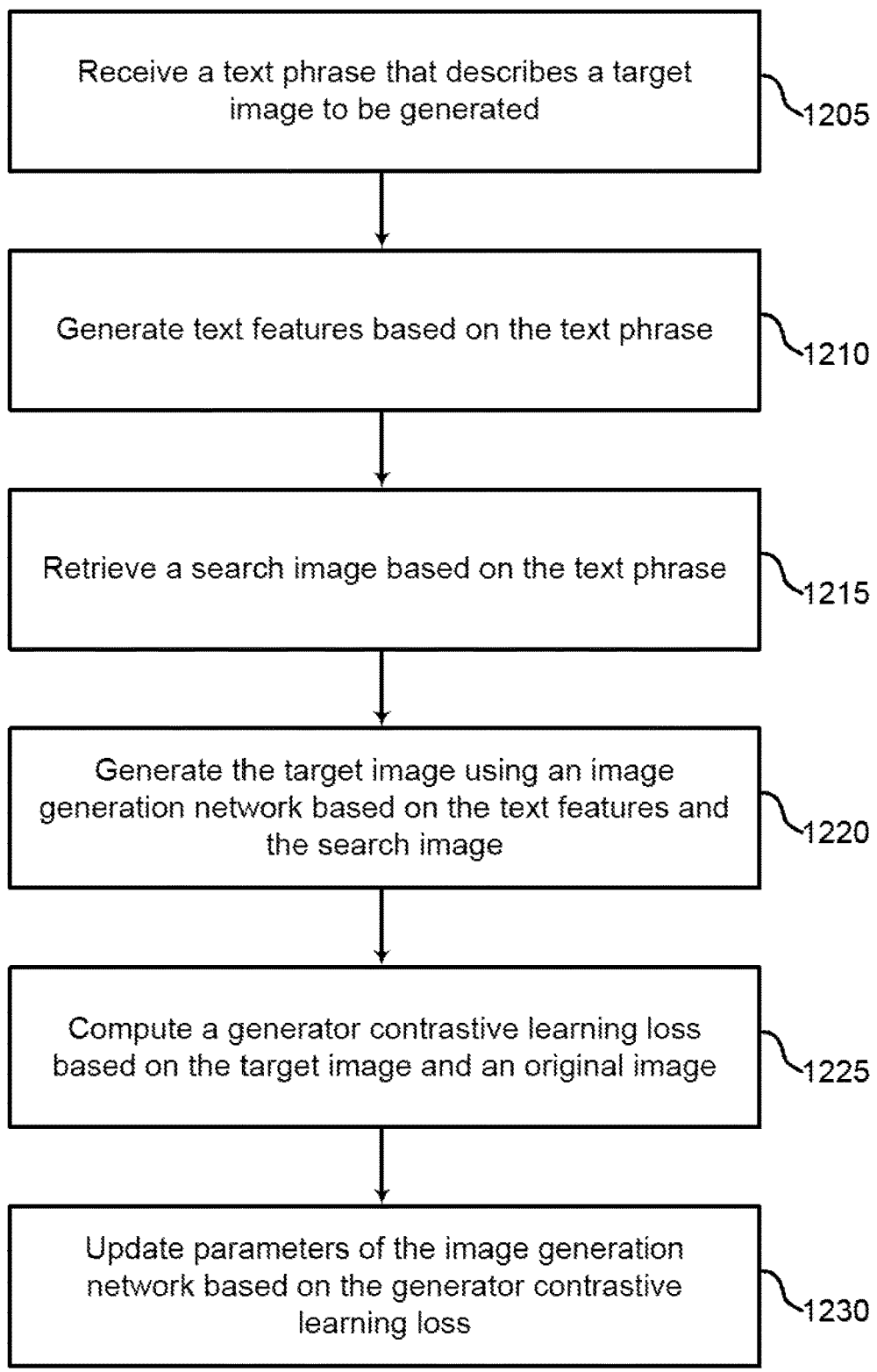
FIG. 12 shows an example of training an image generation network based on a generator contrastive learning loss according to aspects of the present disclosure.
Figure 13:
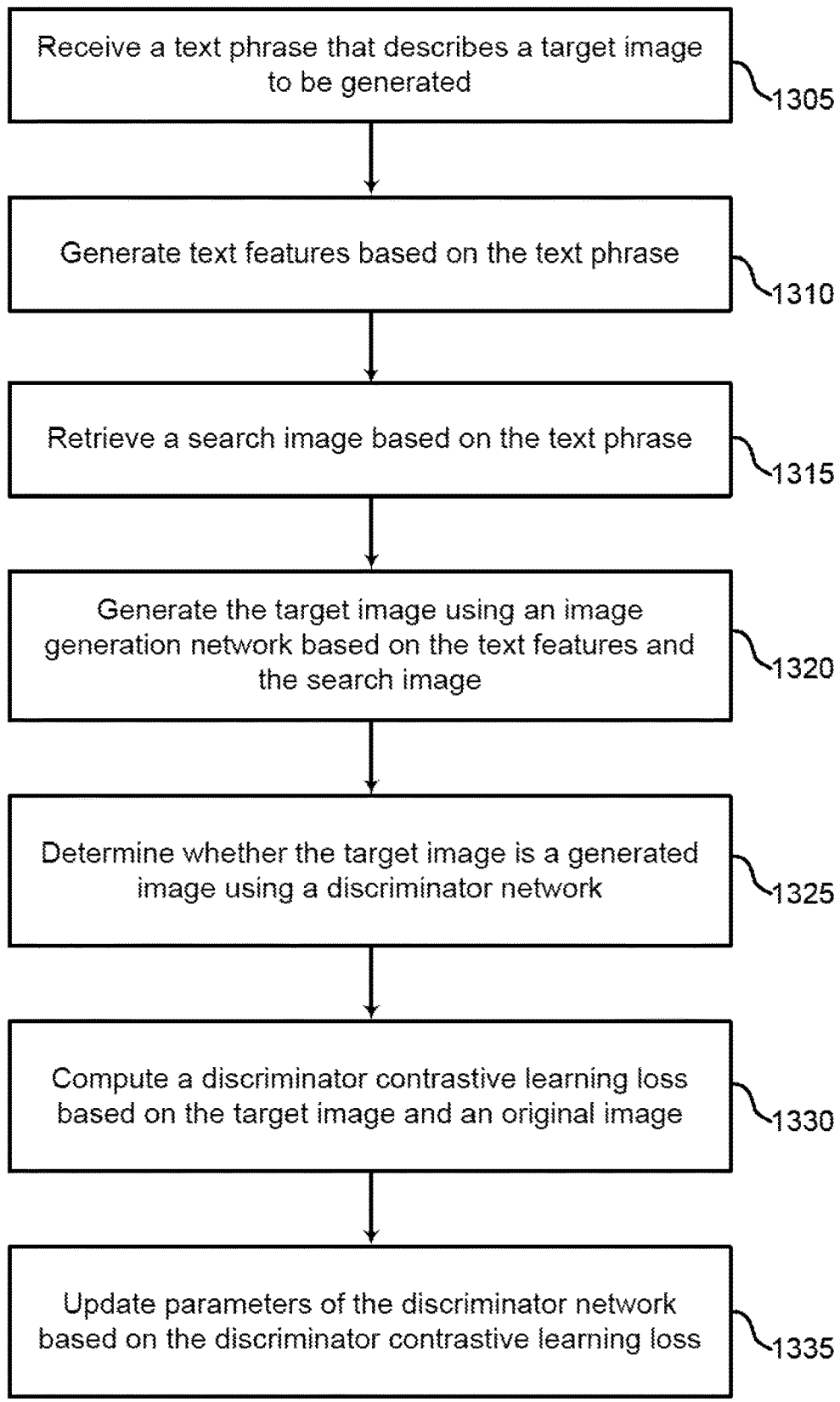
FIG. 13 shows an example of training a discriminator network based on a discriminator contrastive learning loss according to aspects of the present disclosure.

In FIGS. 11-13, a method, apparatus, and non-transitory computer readable medium for training a machine learning model are described. One or more embodiments of the method, apparatus, and non-transitory computer readable medium include receiving a text phrase that describes a target image to be generated; generating text features based on the text phrase; retrieving a search image based on the text phrase; generating the target image using an image generation network based on the text features and the search image; and updating parameters of the image generation network based on the target image.

Some examples of the method, apparatus, and non-transitory computer readable medium further include computing a generator contrastive learning loss based on the target image and an original image, wherein the parameters of the image generation network are updated based on the generator contrastive learning loss.

Some examples of the method, apparatus, and non-transitory computer readable medium further include determining whether the target image is a generated image using a discriminator network. Some examples further include computing a discriminator contrastive learning loss based on the target image and an original image. Some examples further include updating parameters of the discriminator network based on the discriminator contrastive learning loss.

Some examples of the method, apparatus, and non-transitory computer readable medium further include training a text attention network to generate text attention features, wherein the target image is generated based on the text attention features.

Some examples of the method, apparatus, and non-transitory computer readable medium further include training an image attention network to generate image attention features, wherein the target image is generated based on the image attention features.

Some examples of the method, apparatus, and non-transitory computer readable medium further include training a cross-modal encoder configured to encode the search image and the text phrase, wherein the search image is retrieved based on the encoded search image and the encoded text phrase.

Some examples of the method, apparatus, and non-transitory computer readable medium further include generating a random noise vector. Some examples further include combining the random noise vector with the text features to obtain noisy text features. Some examples further include upsampling the noisy text features, wherein the target image is generated based on the upsampled noisy text features.

FIG. 11 shows an example of training a machine learning model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

According to an embodiment, machine learning model 425 is trained using contrastive learning. Contrastive learning refers to a type of machine learning in which a model is trained using the selection of positive and negative sample pairs. Contrastive learning can be used in either a supervised or unsupervised (e.g., self-supervised) training context. A loss function for a contrastive learning model can encourage a model to generate similar results for positive sample pairs, and dissimilar results for negative sample pairs. In self-supervised examples, positive samples can be generated automatically from input data (e.g., by cropping or transforming an existing image).

Accordingly, during the training process, the parameters and weights of the machine learning model are adjusted to increase the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

At operation 1105, the system receives a text phrase that describes a target image to be generated. In some cases, the operations of this step refer to, or may be performed by, training component as described with reference to FIG. 4.

At operation 1110, the system generates text features based on the text phrase. In some cases, the operations of this step refer to, or may be performed by, text encoder as described with reference to FIG. 4. Further detail regarding the process of generating text features using a text encoder is provided with reference to FIGS. 6 and 7.

At operation 1115, the system retrieves a search image based on the text phrase. In some cases, the operations of this step refer to, or may be performed by, image search component as described with reference to FIG. 4. Further detail regarding the process of retrieving a search image using an image search component is provided with reference to FIG. 5.

At operation 1120, the system generates the target image using an image generation network based on the text features and the search image. In some cases, the operations of this step refer to, or may be performed by, image generation network as described with reference to FIG. 4. Further detail regarding the process of generating a target image using an image generation network is provided with reference to FIGS. 5-6.

At operation 1125, the system updates parameters of the image generation network based on the target image. In some cases, the operations of this step refer to, or may be performed by, training component as described with reference to FIG. 4.

According to an embodiment, the system includes a GAN, that is an image generation network (also referred to as a generator network or a generator) and a discriminator network. The image generation network learns to generate plausible data. In some cases, generated images (i.e., output) from the image generation network are used as negative training examples for the discriminator network. The discriminator network learns to distinguish the generator's fake data from real data. The discriminator penalizes the generator for producing implausible results. As training progresses, the generator gets closer to producing output that can fool the discriminator. As generator training continues, the discriminator gets worse at telling the difference between real and fake. It starts to classify fake data as real, and its accuracy decreases.

According to an embodiment, the image generation network (i.e., the generator) and the discriminator are neural networks. The generator output is connected directly to the discriminator input. Through backpropagation, the discriminator's classification provides a signal that the generator uses to update its weights. Training an image generation network (generator) will be described in greater detail in FIG. 12. Training a discriminator network will be described in greater detail in FIG. 13.

FIG. 12 shows an example of training an image generation network based on a generator contrastive learning loss according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1205, the system receives a text phrase that describes a target image to be generated. In some cases, the operations of this step refer to, or may be performed by, training component as described with reference to FIG. 4.

At operation 1210, the system generates text features based on the text phrase. In some cases, the operations of this step refer to, or may be performed by, text encoder as described with reference to FIG. 4.

At operation 1215, the system retrieves a search image based on the text phrase. In some cases, the operations of this step refer to, or may be performed by, image search component as described with reference to FIG. 4. Further detail regarding the process of retrieving a search image using an image search component is provided with reference to FIG. 5.

At operation 1220, the system generates the target image using an image generation network based on the text features and the search image. In some cases, the operations of this step refer to, or may be performed by, image generation network as described with reference to FIGS. 4-6. In some examples, the image generation network generates the target image (i.e., fake data) by incorporating feedback from the discriminator. It learns to make the discriminator classify its output (i.e., the target image) as real.

At operation 1225, the system computes a generator contrastive learning loss based on the target image and an original image. In some cases, the operations of this step refer to, or may be performed by, training component as described with reference to FIG. 4. In some examples, the generator contrastive learning loss is defined to penalize the generator for failing to fool the discriminator.

At operation 1230, the system updates parameters of the image generation network based on the generator contrastive learning loss. In some cases, the operations of this step refer to, or may be performed by, training component as described with reference to FIG. 4.

FIG. 13 shows an example of training a discriminator network based on a discriminator contrastive learning loss according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1305, the system receives a text phrase that describes a target image to be generated. In some cases, the operations of this step refer to, or may be performed by, training component as described with reference to FIG. 4.

At operation 1310, the system generates text features based on the text phrase. In some cases, the operations of this step refer to, or may be performed by, text encoder as described with reference to FIG. 4. Further detail regarding the process of generating text features using a text encoder is provided with reference to FIGS. 6 and 7.

At operation 1315, the system retrieves a search image based on the text phrase. In some cases, the operations of this step refer to, or may be performed by, image search component as described with reference to FIG. 4. Further detail regarding the process of retrieving a search image using an image search component is provided with reference to FIG. 5.

At operation 1320, the system generates the target image using an image generation network based on the text features and the search image. In some cases, the operations of this step refer to, or may be performed by, image generation network as described with reference to FIG. 4. Further detail regarding the process of generating a target image using an image generation network is provided with reference to FIGS. 5-6.

At operation 1325, the system determines whether the target image is a generated image using a discriminator network. In some cases, the operations of this step refer to, or may be performed by, discriminator network. In some examples, the discriminator network in a GAN is a classifier. The discriminator network is configured to distinguish real data from the data (e.g., the generated image) generated by the generator.

The discriminator's training data include real data instances such as real images. The discriminator uses these instances as positive examples during training. The discriminator's training data include fake data instances generated by the generator. The discriminator uses these instances as negative examples during training. The discriminator connects to two loss functions. In some examples, during discriminator training, the discriminator ignores the generator's contrastive learning loss and just uses the discriminator contrastive learning loss.

At operation 1330, the system computes a discriminator contrastive learning loss based on the target image and an original image. In some cases, the operations of this step refer to, or may be performed by, training component as described with reference to FIG. 4. In some examples, during discriminator training, the discriminator classifies both real data and fake data from the generator. The discriminator loss penalizes the discriminator for misclassifying a real instance as fake or a fake instance as real. The discriminator updates its weights through backpropagation from the discriminator loss through the discriminator network.

At operation 1335, the system updates parameters of the discriminator network based on the discriminator contrastive learning loss. In some cases, the operations of this step refer to, or may be performed by, training component as described with reference to FIG. 4.

Performance of apparatus, systems and methods of the present disclosure have been evaluated, and results indicate embodiments of the present disclosure have obtained increased performance over existing technology. Example experiments demonstrate that the image generation apparatus outperforms conventional systems.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for image processing using a computing system including at least one processor and at least one memory, the method comprising:
    receiving, by the computing system, a text phrase that describes a target object;
    generating, by the computing system, text features based on the text phrase, wherein the text features represent the target object in an embedding space;
    generating a random noise vector;
    combining the random noise vector with the text features to obtain noisy text features;
    upsampling the noisy text features;
    retrieving, by the computing system from a database, a search image using the text phrase as a search query; and
    generating, by the computing system using an image generation network comprising parameters stored in the at least one memory, a target image depicting the target object based on the noisy text features and the search image.

2. The method of claim 1, further comprising:
    encoding the search image using a cross-modal encoder to obtain a search image representation;
    encoding the text phrase using the cross-modal encoder to obtain a text phrase representation; and
    selecting the search image by comparing the search image representation and the text phrase representation.

3. The method of claim 1, further comprising:
    applying a text attention network to the text features to obtain text attention features, wherein the target image is generated based on the text attention features.

4. The method of claim 1, further comprising:
    applying an image attention network to the search image to obtain image attention features, wherein the target image is generated based on the image attention features.

5. The method of claim 1, further comprising:
    retrieving a plurality of search images based on the text phrase, wherein the target image is generated based on the plurality of search images.

6. A method for training a machine learning model using a computing system including at least one processor and at least one memory, the method comprising:
    receiving, by the computing system, a text phrase that describes a target object;
    generating, by the computing system, text features based on the text phrase, wherein the text features represent the target object in an embedding space;
    generating a random noise vector;
    combining the random noise vector with the text features to obtain noisy text features;
    upsampling the noisy text features;
    retrieving, by the computing system from a database, a search image using the text phrase as a search query;
    generating, by the computing system using an image generation network comprising parameters stored in the at least one memory, a target image depicting the target object based on the noisy text features and the search image; and
    updating the parameters of the image generation network based on the target image.

7. The method of claim 6, further comprising:
    computing a generator contrastive learning loss based on the target image and an original image, wherein the parameters of the image generation network are updated based on the generator contrastive learning loss.

8. The method of claim 6, further comprising:
    determining whether the target image is a generated image using a discriminator network;
    computing a discriminator contrastive learning loss based on the target image and an original image; and
    updating parameters of the discriminator network based on the discriminator contrastive learning loss.

9. The method of claim 6, further comprising:
    training a text attention network to generate text attention features, wherein the target image is generated based on the text attention features.

10. The method of claim 6, further comprising:
    training an image attention network to generate image attention features, wherein the target image is generated based on the image attention features.

11. The method of claim 6, further comprising:
    training a cross-modal encoder configured to encode the search image and the text phrase, wherein the search image is retrieved based on the encoded search image and the encoded text phrase.

12. An apparatus for image processing, comprising:
    at least one processor;
    at least one memory including instructions executable by the at least one processor;
    a text encoder configured to generate text features based on a text phrase that describes a target object, wherein the text features represent the target object in an embedding space, and wherein the apparatus is configured to generate a random noise vector, combine the random noise vector with the text features to obtain noisy text features, and upsample the noisy text features;
    an image search component configured to retrieve a search image using the text phrase as a search query; and
    an image generation network comprising parameters stored in the at least one memory trained to generate a target image depicting the target object based on the noisy text features and the search image.

13. The apparatus of claim 12, further comprising:
    a cross-modal encoder configured to encode the search image and the text phrase, wherein the search image is retrieved based on the encoded search image and the encoded text phrase.

14. The apparatus of claim 12, further comprising:
    a text attention network configured to generate text attention features, wherein the target image is generated based on the text attention features.

15. The apparatus of claim 12, further comprising:
an image attention network configured to generate image attention features, wherein the target image is generated based on the image attention features.

16. The apparatus of claim 12, further comprising:
a discriminator network configured to detect whether an output of the image generation network is a generated image.

17. The apparatus of claim 12, wherein:
the image generation network comprises a generative adversarial network (GAN).

18. The apparatus of claim 12, wherein:
the text encoder comprises a recurrent neural network (RNN).

* * * * *